(12) United States Patent
Rapp et al.

(10) Patent No.: US 7,373,432 B2
(45) Date of Patent: May 13, 2008

(54) PROGRAMMABLE CIRCUIT AND RELATED COMPUTING MACHINE AND METHOD

(75) Inventors: John W. Rapp, Manassas, VA (US); Larry Jackson, Manassas, VA (US); Mark Jones, Centreville, VA (US); Troy Cherasaro, Culpeper, VA (US)

(73) Assignee: Lockheed Martin, Manassas, VA (US)

( * ) Notice: Subject to any disclaimer, the term of this patent is extended or adjusted under 35 U.S.C. 154(b) by 209 days.

(21) Appl. No.: 10/684,057

(22) Filed: Oct. 9, 2003

(65) Prior Publication Data

US 2004/0170070 A1 Sep. 2, 2004

Related U.S. Application Data

(60) Provisional application No. 60/422,503, filed on Oct. 31, 2002.

(51) Int. Cl.
*G06F 3/00* (2006.01)
*G06F 15/76* (2006.01)
*H03K 19/00* (2006.01)

(52) U.S. Cl. .............................. 710/8; 712/10; 712/37; 716/16; 716/17

(58) Field of Classification Search .................. 710/8; 712/10, 15, 22; 716/12, 16
See application file for complete search history.

(56) References Cited

U.S. PATENT DOCUMENTS 4,956,771 A 9/1990 Neustaedter
5,583,964 A 12/1996 Wang (Continued)

FOREIGN PATENT DOCUMENTS

EP 0 694 847 A2 1/1996

(Continued)

OTHER PUBLICATIONS

Vermeulen F. et al., "Flexible Hardware Acceleration of Multimedia Oriented Microprocessors", Micro-33. Proceedings of the 33rd Annual ACM/IEEE International Symposium on Microarchitecture. Monterey, CA, Dec. 10-13, 2000, Proceedings of the Annual ACM/IEEE International Symposium on Microarchitecture, Los Alamitos, CA: IEEE Comp. Soc, US, Dec. 10, 2000, pp. 171-177.

(Continued)

*Primary Examiner*—Alford Kindred
*Assistant Examiner*—Richard B. Franklin
(74) *Attorney, Agent, or Firm*—Graybeal Jackson Haley

(57) ABSTRACT

A programmable circuit receives configuration data from an external source, stores the firmware in a memory, and then downloads the firmware from the memory. Such a programmable circuit allows a system, such as a computing machine, to modify the programmable circuit's configuration, thus eliminating the need for manually reprogramming the configuration memory. For example, if the programmable circuit is an FPGA that is part of a pipeline accelerator, a processor coupled to the accelerator can modify the configuration of the FPGA. More specifically, the processor retrieves from a configuration registry firmware that represents the modified configuration, and sends the firmware to the FPGA, which then stores the firmware in a memory such as an electrically erasable and programmable read-only memory (EEPROM). Next, the FPGA downloads the firmware from the memory into its configuration registers, and thus reconfigures itself to have the modified configuration.

31 Claims, 6 Drawing Sheets

U.S. PATENT DOCUMENTS

| | | | |
|---|---|---|---|
| 5,640,107 A * | 6/1997 | Kruse | 326/38 |
| 5,784,636 A | 7/1998 | Rupp et al. | |
| 5,892,962 A | 4/1999 | Cloutier | |
| 6,049,222 A | 4/2000 | Lawman et al. | |
| 6,096,091 A * | 8/2000 | Hartmann | 716/16 |
| 6,308,311 B1 * | 10/2001 | Carmichael et al. | 716/16 |
| 6,326,806 B1 | 12/2001 | Fallside et al. | |
| 6,704,816 B1 | 3/2004 | Burke | |
| 6,839,873 B1 * | 1/2005 | Moore | 714/725 |
| 2001/0014937 A1 | 8/2001 | Huppenthal et al. | |
| 2003/0009651 A1 * | 1/2003 | Najam et al. | 712/34 |
| 2003/0061409 A1 * | 3/2003 | RuDusky | 710/8 |
| 2003/0177223 A1 * | 9/2003 | Erickson et al. | 709/224 |
| 2004/0061147 A1 * | 4/2004 | Fujita et al. | 257/232 |
| 2004/0181621 A1 | 9/2004 | Mathur et al. | |
| 2006/0236018 A1 * | 10/2006 | Dao et al. | 710/317 |

FOREIGN PATENT DOCUMENTS

| | | | |
|---|---|---|---|
| EP | 0 945 788 A2 | 9/1999 | |
| EP | 1 061 438 A1 | 12/2000 | |
| EP | 1 061 439 A1 | 12/2000 | |
| EP | 0 945 788 A3 | 6/2002 | |

OTHER PUBLICATIONS

International Search Report for PCT/US 03/34557, Dec. 21, 2004.
International Search Report for PCT/US 03/34559, Jan. 7, 2005.
Salcic Z et al., "FLIX Environment for generation of custom-configurable machines in FPLDs for embedded applications", Microprocessors and Microsystems, IPC Business Press Ltd. London, GB, vol. 23, No. 8-9, Dec. 15, 1999, pp. 513-526.
International Search Report of PCT/US 03/34558, Jun. 16, 2005.
International Search Report for PCT/US 03/34556, Mar. 7, 2006.
International Search Report for PCT/US2005/035818 dated Aug. 4, 2006.
Bakshi S; Gajski D D; "Partitioning and Pipelining for Performance-Constrained Hardware/Software Systems", IEEE Transactions on Very Large Scale Integration (VLSI) Systems, vol. 7, NR. 4, p. 419-432, (Dec. 1999), XP000869229.

* cited by examiner

US 7,373,432 B2

PROGRAMMABLE CIRCUIT AND RELATED COMPUTING MACHINE AND METHOD

CLAIM OF PRIORITY

This application claims priority to U.S. Provisional Application Ser. No. 60/422,503, filed on Oct. 31, 2002, which is incorporated by reference.

CROSS REFERENCE TO RELATED APPLICATIONS

This application is related to U.S. patent application Ser. Nos. 10/684,102 entitled IMPROVED COMPUTING ARCHITECTURE AND RELATED SYSTEM AND METHOD, Ser. No. 10/684,053 entitled COMPUTING MACHINE HAVING IMPROVED COMPUTING ARCHITECTURE AND RELATED SYSTEM AND METHOD; Ser. No. 10/683,929 entitled PIPELINE ACCELERATOR FOR IMPROVED COMPUTING ARCHITECTURE AND RELATED SYSTEM AND METHOD and Ser. No. 10/683,932 entitled PIPELINE ACCELERATOR HAVING MULTIPLE PIPELINE UNITS AND RELATED COMPUTING MACHINE AND METHOD, which have a common filing date and owner and which are incorporated by reference.

BACKGROUND

A common computing architecture for processing relatively large amounts of data in a relatively short period of time includes multiple interconnected processors that share the processing burden. By sharing the processing burden, these multiple processors can often process the data more quickly than a single processor can for a given clock frequency. For example, each of the processors can process a respective portion of the data or execute a respective portion of a processing algorithm.

FIG. 1 is a schematic block diagram of a conventional computing machine 10 having a multi-processor architecture. The machine 10 includes a master processor 12 and coprocessors $14_1$-$14_n$, which communicate with each other and the master processor via a bus 16, an input port 18 for receiving raw data from a remote device (not shown in FIG. 1), and an output port 20 for providing processed data to the remote source. The machine 10 also includes a memory 22 for the master processor 12, respective memories $24_1$-$24_n$ for the coprocessors $14_1$-$14_n$, and a memory 26 that the master processor and coprocessors share via the bus 16. The memory 22 serves as both a program and a working memory for the master processor 12, and each memory $24_1$-$24_n$ serves as both a program and a working memory for a respective coprocessor $14_1$-$14_n$. The shared memory 26 allows the master processor 12 and the coprocessors 14 to transfer data among themselves, and from/to the remote device via the ports 18 and 20, respectively. The master processor 12 and the coprocessors 14 also receive a common clock signal that controls the speed at which the machine 10 processes the raw data.

In general, the computing machine 10 effectively divides the processing of raw data among the master processor 12 and the coprocessors 14. The remote source (not shown in FIG. 1) such as a sonar array loads the raw data via the port 18 into a section of the shared memory 26, which acts as a first-in-first-out (FIFO) buffer (not shown) for the raw data. The master processor 12 retrieves the raw data from the memory 26 via the bus 16, and then the master processor and the coprocessors 14 process the raw data, transferring data among themselves as necessary via the bus 16. The master processor 12 loads the processed data into another FIFO buffer (not shown) defined in the shared memory 26, and the remote source retrieves the processed data from this FIFO via the port 20.

In an example of operation, the computing machine 10 processes the raw data by sequentially performing n+1 respective operations on the raw data, where these operations together compose a processing algorithm such as a Fast Fourier Transform (FFT). More specifically, the machine 10 forms a data-processing pipeline from the master processor 12 and the coprocessors 14. For a given frequency of the clock signal, such a pipeline often allows the machine 10 to process the raw data faster than a machine having only a single processor.

After retrieving the raw data from the raw-data FIFO (not shown) in the memory 26, the master processor 12 performs a first operation, such as a trigonometric function, on the raw data. This operation yields a first result, which the processor 12 stores in a first-result FIFO (not shown) defined within the memory 26. Typically, the processor 12 executes a program stored in the memory 22, and performs the above-described actions under the control of the program. The processor 12 may also use the memory 22 as working memory to temporarily store data that the processor generates at intermediate intervals of the first operation.

Next, after retrieving the first result from the first-result FIFO (not shown) in the memory 26, the coprocessor $14_1$ performs a second operation, such as a logarithmic function, on the first result. This second operation yields a second result, which the coprocessor $14_1$ stores in a second-result FIFO (not shown) defined within the memory 26. Typically, the coprocessor $14_1$ executes a program stored in the memory $24_1$, and performs the above-described actions under the control of the program. The coprocessor $14_1$ may also use the memory $24_1$ as working memory to temporarily store data that the coprocessor generates at intermediate intervals of the second operation.

Then, the coprocessors $24_2$-$24_n$ sequentially perform third—$n^{th}$ operations on the second—$(n-1)^{th}$ results in a manner similar to that discussed above for the coprocessor $24_1$.

The $n^{th}$ operation, which is performed by the coprocessor $24_n$, yields the final result, i.e., the processed data. The coprocessor $24_n$ loads the processed data into a processed-data FIFO (not shown) defined within the memory 26, and the remote device (not shown in FIG. 1) retrieves the processed data from this FIFO.

Because the master processor 12 and coprocessors 14 are simultaneously performing different operations of the processing algorithm, the computing machine 10 is often able to process the raw data faster than a computing machine having a single processor that sequentially performs the different operations. Specifically, the single processor cannot retrieve a new set of the raw data until it performs all n+1 operations on the previous set of raw data. But using the pipeline technique discussed above, the master processor 12 can retrieve a new set of raw data after performing only the first operation. Consequently, for a given clock frequency, this pipeline technique can increase the speed at which the machine 10 processes the raw data by a factor of approximately n+1 as compared to a single-processor machine (not shown in FIG. 1).

Alternatively, the computing machine 10 may process the raw data in parallel by simultaneously performing n+1 instances of a processing algorithm, such as an FFT, on the raw data. That is, if the algorithm includes n+1 sequential operations as described above in the previous example, then each of the master processor 12 and the coprocessors 14 sequentially perform all n+1 operations on respective sets of the raw data. Consequently, for a given clock frequency, this parallel-processing technique, like the above-described pipeline technique, can increase the speed at which the machine 10 processes the raw data by a factor of approximately n+1 as compared to a single-processor machine (not shown in FIG. 1).

Unfortunately, although the computing machine 10 can process data more quickly than a single-processor computing machine (not shown in FIG. 1), the data-processing speed of the machine 10 is often significantly less than the frequency of the processor clock. Specifically, the data-processing speed of the computing machine 10 is limited by the time that the master processor 12 and coprocessors 14 require to process data. For brevity, an example of this speed limitation is discussed in conjunction with the master processor 12, although it is understood that this discussion also applies to the coprocessors 14. As discussed above, the master processor 12 executes a program that controls the processor to manipulate data in a desired manner. This program includes a sequence of instructions that the processor 12 executes. Unfortunately, the processor 12 typically requires multiple clock cycles to execute a single instruction, and often must execute multiple instructions to process a single value of data. For example, suppose that the processor 12 is to multiply a first data value A (not shown) by a second data value B (not shown). During a first clock cycle, the processor 12 retrieves a multiply instruction from the memory 22. During second and third clock cycles, the processor 12 respectively retrieves A and B from the memory 26. During a fourth clock cycle, the processor 12 multiplies A and B, and, during a fifth clock cycle, stores the resulting product in the memory 22 or 26 or provides the resulting product to the remote device (not shown). This is a best-case scenario, because in many cases the processor 12 requires additional clock cycles for overhead tasks such as initializing and closing counters. Therefore, at best the processor 12 requires five clock cycles, or an average of 2.5 clock cycles per data value, to process A and B.

Consequently, the speed at which the computing machine 10 processes data is often significantly lower than the frequency of the clock that drives the master processor 12 and the coprocessors 14. For example, if the processor 12 is clocked at 1.0 Gigahertz (GHz) but requires an average of 2.5 clock cycles per data value, then the effective data-processing speed equals (1.0 GHz)/2.5=0.4 GHz. This effective data-processing speed is often characterized in units of operations per second. Therefore, in this example, for a clock speed of 1.0 GHz, the processor 12 would be rated with a data-processing speed of 0.4 Gigaoperations/second (Gops).

FIG. 2 is a block diagram of a hardwired data pipeline 30 that can typically process data faster than a processor can for a given clock frequency, and often at substantially the same rate at which the pipeline is clocked. The pipeline 30 includes operator circuits $32_1$-$32_n$, which each perform a respective operation on respective data without executing program instructions. That is, the desired operation is "burned in" to a circuit 32 such that it implements the operation automatically, without the need of program instructions. By eliminating the overhead associated with executing program instructions, the pipeline 30 can typically perform more operations per second than a processor can for a given clock frequency.

For example, the pipeline 30 can often solve the following equation faster than a processor can for a given clock frequency:

$$Y(x_k)=(5x_k+3)2^{x_k}$$

where $x_k$ represents a sequence of raw data values. In this example, the operator circuit $32_1$ is a multiplier that calculates $5x_k$, the circuit $32_2$ is an adder that calculates $5x_k+3$, and the circuit $32_n$ (n=3) is a multiplier that calculates $(5x_k+3)2^{x_k}$.

During a first clock cycle k=1, the circuit $32_1$ receives data value x, and multiplies it by 5 to generate $5x_1$.

During a second clock cycle k=2, the circuit $32_2$ receives $5x_1$ from the circuit $32_1$ and adds 3 to generate $5x_1+3$. Also, during the second clock cycle, the circuit $32_1$ generates $5x_2$.

During a third clock cycle k=3, the circuit $32_3$ receives $5x_1+3$ from the circuit $32_2$ and multiplies by $2^{x_1}$ (effectively left shifts $5x_1+3$ by $x_1$) to generate the first result $(5x_1+3)2^{x_1}$. Also during the third clock cycle, the circuit $32_1$ generates $5x_3$ and the circuit $32_2$ generates $5x_2+3$.

The pipeline 30 continues processing subsequent raw data values $x_k$ in this manner until all the raw data values are processed.

Consequently, a delay of two clock cycles after receiving a raw data value $x_1$—this delay is often called the latency of the pipeline 30—the pipeline generates the result $(5x_1+3)2^{x_1}$, and thereafter generates one result—e.g., $(5x_2+3)2^{x_2}$, $(5x_3+3)2^{x_3}$, . . . , $5x_n+3)2^{x_n}$—each clock cycle.

Disregarding the latency, the pipeline 30 thus has a data-processing speed equal to the clock speed. In comparison, assuming that the master processor 12 and coprocessors 14 (FIG. 1) have data-processing speeds that are 0.4 times the clock speed as in the above example, the pipeline 30 can process data 2.5 times faster than the computing machine 10 (FIG. 1) for a given clock speed.

Still referring to FIG. 2, a designer may choose to implement the pipeline 30 in a programmable logic IC (PLIC), such as a field-programmable gate array (FPGA), because a PLIC allows more design and modification flexibility than does an application specific IC (ASIC). To configure the hardwired connections within a PLIC, the designer merely sets interconnection-configuration registers disposed within the PLIC to predetermined binary states. The combination of all these binary states is often called "firmware." Typically, the designer loads this firmware into a nonvolatile memory (not shown in FIG. 2) that is coupled to the PLIC. When one "turns on" the PLIC, it downloads the firmware from the memory into the interconnection-configuration registers. Therefore, to modify the functioning of the PLIC, the designer merely modifies the firmware and allows the PLIC to download the modified firmware into the interconnection-configuration registers. This ability to modify the PLIC by merely modifying the firmware is particularly useful during the prototyping stage and for upgrading the pipeline 30 "in the field".

Unfortunately, the hardwired pipeline 30 may not be the best choice to execute algorithms that entail significant decision making, particularly nested decision making. A processor can typically execute a nested-decision-making instruction (e.g., a nested conditional instruction such as "if A, then do B, else if C, do D, . . . , else do n") approximately as fast as it can execute an operational instruction (e.g., "A+B") of comparable length. But although the pipeline 30 may be able to make a relatively simple decision (e.g., "A>B?") efficiently, it typically cannot execute a nested decision (e.g., "if A, then do B, else if C, do D, . . . , else do n") as efficiently as a processor can. One reason for this inefficiency is that the pipeline 30 may have little on-board memory, and thus may need to access external working/program memory (not shown). And although one may be able to design the pipeline 30 to execute such a nested decision, the size and complexity of the required circuitry often makes such a design impractical, particularly where an algorithm includes multiple different nested decisions.

Consequently, processors are typically used in applications that require significant decision making, and hardwired pipelines are typically limited to "number crunching" applications that entail little or no decision making.

Furthermore, as discussed below, it is typically much easier for one to design/modify a processor-based computing machine, such as the computing machine 10 of FIG. 1, than it is to design/modify a hardwired pipeline such as the pipeline 30 of FIG. 2, particularly where the pipeline 30 includes multiple PLICs.

Computing components, such as processors and their peripherals (e.g., memory), typically include industry-standard communication interfaces that facilitate the interconnection of the components to form a processor-based computing machine.

Typically, a standard communication interface includes two layers: a physical layer and a services layer.

The physical layer includes the circuitry and the corresponding circuit interconnections that form the communication interface, and the operating parameters of this circuitry. For example, the physical layer includes the pins that connect the component to a bus, the buffers that latch data received from the pins, the drivers that drive signals onto the pins, and circuitry for recovering data from an input data signal and for recovering a clock signal from the data signal or from an external clock signal. The operating parameters include the acceptable voltage range of the data signals that the pins receive, the signal timing for writing and reading data, and the supported modes of operation (e.g., burst mode, page mode). Conventional physical layers include transistor-transistor logic (TTL) and RAMBUS.

The services layer includes the protocol by which a computing component transfers data. The protocol defines the format of the data and the manner in which the component sends and receives the formatted data. Conventional communication protocols include file-transfer protocol (FTP) and transmission control protocol/internet protocol (TCP/IP).

Consequently, because manufacturers and others typically design computing components having industry-standard communication interfaces, one can typically design the interface of such a component and interconnect it to other computing components with relatively little effort. This allows one to devote most of his time to designing the other portions of the computing machine, and to easily modify the machine by adding or removing components.

Designing a computing component that supports an industry-standard communication interface allows one to save design time by using an existing physical-layer design from a design library. This also insures that he/she can easily interface the component to off-the-shelf computing components.

And designing a computing machine using computing components that support a common industry-standard communication interface allows the designer to interconnect the components with little time and effort. Because the components support a common interface, the designer can interconnect them via a system bus with little design effort. And because the supported interface is an industry standard, one can easily modify the machine. For example, one can add different components and peripherals to the machine as the system design evolves, or can easily add/design next-generation components as the technology evolves. Furthermore, because the components support a common industry-standard services layer, one can incorporate into the computing machine's software an existing software module that implements the corresponding protocol. Therefore, one can interface the components with little effort because the interface design is essentially already in place, and thus can focus on designing the portions (e.g., software) of the machine that cause the machine to perform the desired function(s).

But unfortunately, there are no known industry-standard services layers for components, such as PLICs, used to form hardwired pipelines such as the pipeline 30 of FIG. 2.

Consequently, to design a pipeline having multiple PLICs, one typically spends a significant amount of time and exerts a significant effort designing "from scratch" and debugging the services layer of the communication interface between the PLICs. Typically, such an ad hoc services layer depends on the parameters of the data being transferred between the PLICs. Likewise, to design a pipeline that interfaces to a processor, one would have to spend a significant amount of time and exert a significant effort in designing and debugging the services layer of the communication interface between the pipeline and the processor.

Similarly, to modify such a pipeline by adding a PLIC to it, one typically spends a significant amount of time and exerts a significant effort designing and debugging the services layer of the communication interface between the added PLIC and the existing PLICs. Likewise, to modify a pipeline by adding a processor, or to modify a computing machine by adding a pipeline, one would have to spend a significant amount of time and exert a significant effort in designing and debugging the services layer of the communication interface between the pipeline and processor.

Consequently, referring to FIGS. 1 and 2, because of the difficulties in interfacing multiple PLICs and in interfacing a processor to a pipeline, one is often forced to make significant tradeoffs when designing a computing machine. For example, with a processor-based computing machine, one is forced to trade number-crunching speed and design/modification flexibility for complex decision-making ability. Conversely, with a hardwired pipeline-based computing machine, one is forced to trade complex-decision-making ability and design/modification flexibility for number-crunching speed. Furthermore, because of the difficulties in interfacing multiple PLICs, it is often impractical for one to design a pipeline-based machine having more than a few PLICs. As a result, a practical pipeline-based machine often has limited functionality. And because of the difficulties in interfacing a processor to a PLIC, it would be impractical to interface a processor to more than one PLIC. As a result, the benefits obtained by combining a processor and a pipeline would be minimal.

Therefore, a need has arisen for a new computing architecture that allows one to combine the decision-making ability of a processor-based machine with the number-crunching speed of a hardwired-pipeline-based machine.

SUMMARY

According to an embodiment of the invention, a programmable circuit receives firmware from an external source, stores the firmware in a memory, and then downloads the firmware from the memory.

Such a programmable circuit allows a system, such as a computing machine, to modify a programmable circuit's configuration, thus eliminating the need for manually reprogramming the configuration memory. For example, if the programmable circuit is an FPGA that is part of a pipeline accelerator, a processor coupled to the accelerator can modify the configuration of the FPGA. More specifically, the processor retrieves from a configuration registry firmware that represents the modified configuration, and sends the firmware to the FPGA, which then stores the firmware in a memory such as an electrically erasable and programmable read-only memory (EEPROM). Next, the FPGA downloads the firmware from the memory into its configuration registers, and thus effectively reconfigures itself to have the modified configuration.

DETAILED DESCRIPTION

Figure 1:
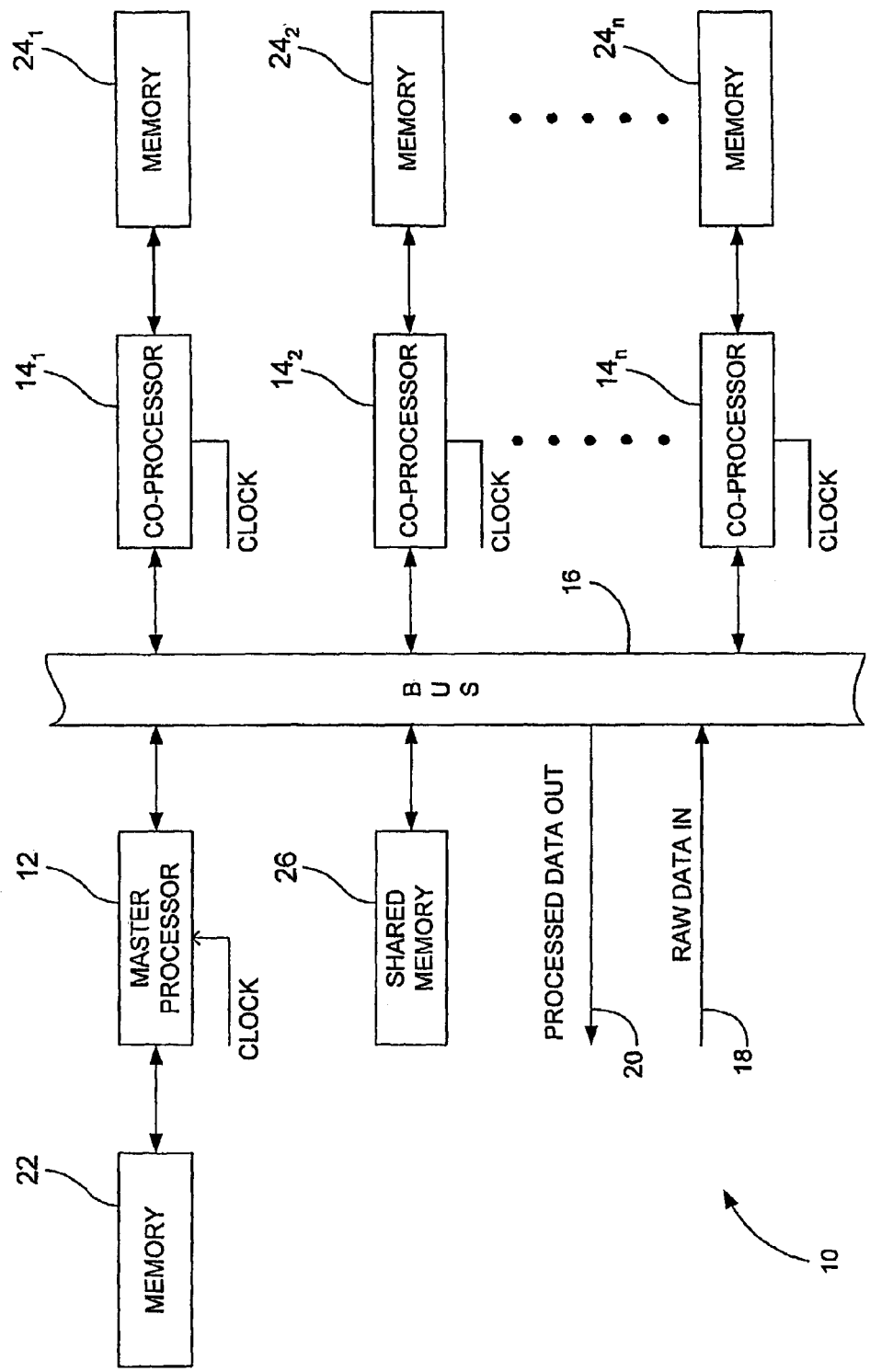
FIG. 1 is a block diagram of a computing machine having a conventional multi-processor architecture.
Figure 2:
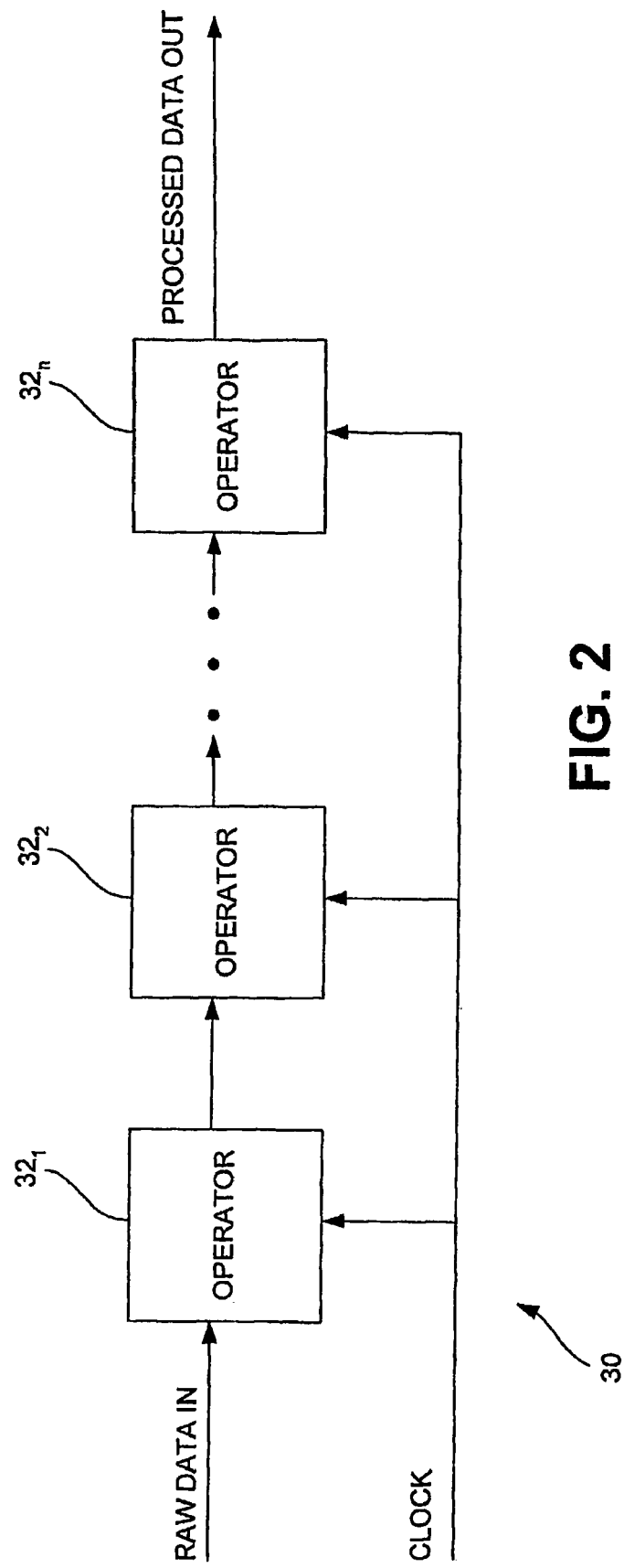
FIG. 2 is a block diagram of a conventional hardwired pipeline.
Figure 3:
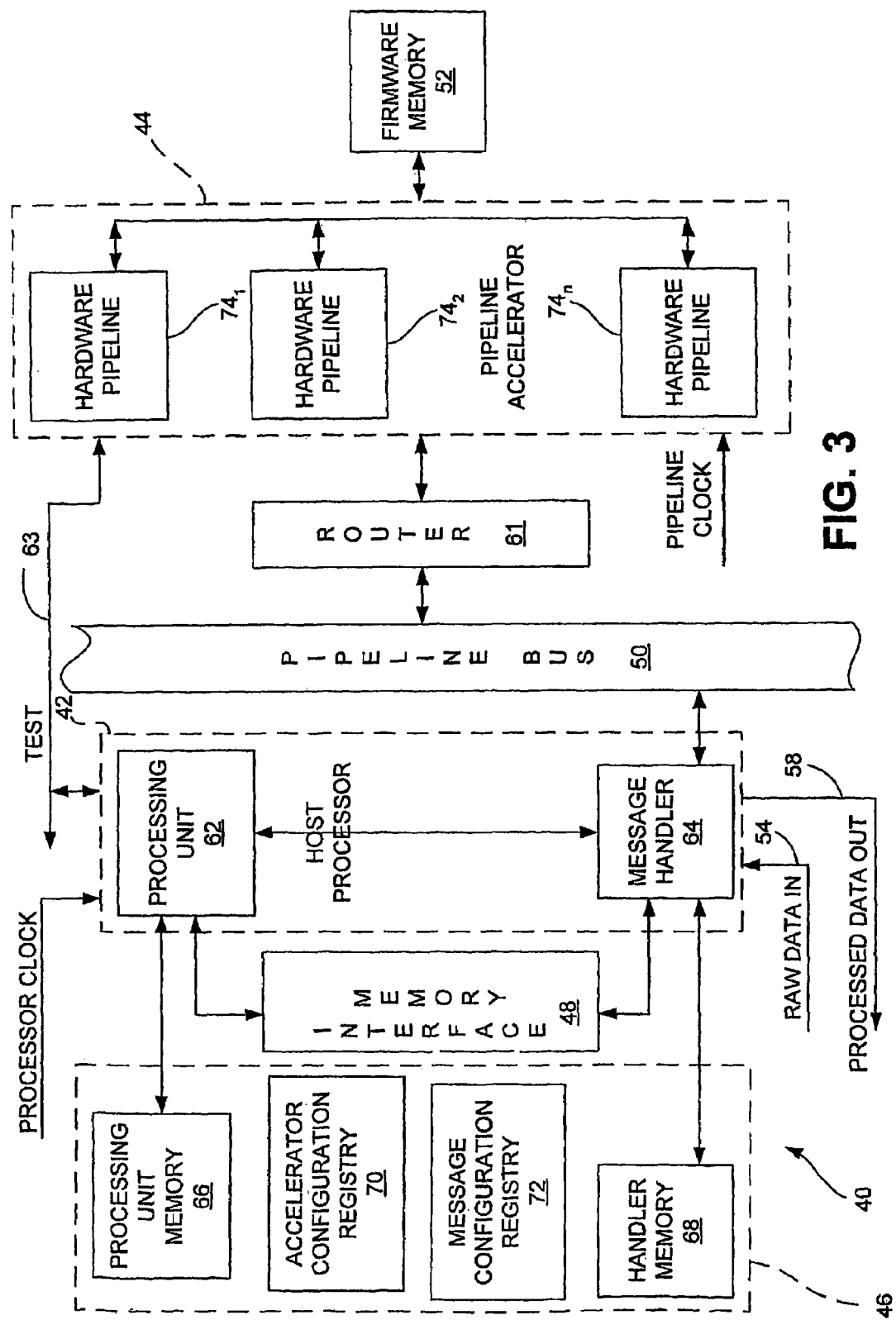
FIG. 3 is a block diagram of a computing machine having a peer-vector architecture according to an embodiment of the invention.

FIG. 3 is a schematic block diagram of a computing machine 40, which has a peer-vector architecture according to an embodiment of the invention. In addition to a host processor 42, the peer-vector machine 40 includes a pipeline accelerator 44, which performs at least a portion of the data processing, and which thus effectively replaces the bank of coprocessors 14 in the computing machine 10 of FIG. 1. Therefore, the host-processor 42 and the accelerator 44 (or pipeline units thereof, as discussed below) are "peers" that can transfer data vectors back and forth. Because the accelerator 44 does not execute program instructions, it typically performs mathematically intensive operations on data significantly faster than a bank of coprocessors can for a given clock frequency. Consequently, by combining the decision-making ability of the processor 42 and the number-crunching ability of the accelerator 44, the machine 40 has the same abilities as, but can often process data faster than, a conventional computing machine such as the machine 10. Furthermore, as discussed below, providing the accelerator 44 with a communication interface that is compatible with the communication interface of the host processor 42 facilitates the design and modification of the machine 40, particularly where the processor's communication interface is an industry standard. And where the accelerator 44 includes one or more PLICs, the host processor 42 can hard configure physical interconnectors within the accelerator by sending appropriate firmware to these PLICs. The host processor 42 may not only configure the accelerator 44 in this manner during initialization of the peer-vector machine 40, but it may have the ability to reconfigure the accelerator during operation of the peer-vector machine as discussed below and in previously cited U.S. patent application Ser. No. 10/684,053 entitled COMPUTING MACHINE HAVING IMPROVED COMPUTING ARCHITECTURE AND RELATED SYSTEM AND METHOD. Moreover, the peer-vector machine 40 may also provide other advantages as described below and in the previously cited patent applications.

Still referring to FIG. 3, in addition to the host processor 42 and the pipeline accelerator 44, the peer-vector computing machine 40 includes a processor memory 46, an interface memory 48, a pipeline bus 50, one or more firmware memories 52, an optional raw-data input port 54, a processed-data output port 58, an optional router 61, and a test bus 63.

The host processor 42 includes a processing unit 62 and a message handler 64, and the processor memory 46 includes a processing-unit memory 66 and a handler memory 68, which respectively serve as both program and working memories for the processor unit and the message handler. The processor memory 46 also includes an accelerator-configuration registry 70 and a message-configuration registry 72, which store firmware and configuration data that respectively allow the host processor 42 to configure the functioning of the accelerator 44 and the format of the messages that the message handler 64 sends and receives. The configuration of the accelerator 44 and the message handler 64 is further discussed in previously cited U.S. patent application Ser. No. 10/684,053 entitled COMPUTING MACHINE HAVING IMPROVED COMPUTING ARCHITECTURE AND RELATED SYSTEM AND METHOD, and the configuration of the accelerator 44 is also further discussed below in conjunction with FIGS. 4-6.

The pipeline accelerator 44 is disposed on at least one PLIC (FIG. 4) and includes hardwired pipelines $74_1$-$74_n$, which process respective data without executing program instructions. The firmware memory 52 stores the firmware for the accelerator 44. More specifically, the firmware memory 52 stores the firmware for the PLICs that compose the accelerator 44 as discussed further below in conjunction with FIGS. 4-6. Alternatively, the accelerator 44 may be disposed on at least one ASIC, and thus may have internal interconnections that are unconfigurable once the ASIC is formed. In this alternative where the accelerator 44 includes no PLICs, the machine 40 may omit the firmware memory 52. Furthermore, although the accelerator 44 is shown including multiple pipelines $74_1$-$74_n$, it may include only a single pipeline. In addition, although not shown, the accelerator 44 may include one or more processors such as a digital-signal processor (DSP). Moreover, although not shown, the accelerator 44 may include a data input port and/or a data output port.

The general operation of the peer-vector machine 40 is discussed in previously cited U.S. patent application Ser. No. 10/684,102 entitled IMPROVED COMPUTING ARCHITECTURE AND RELATED SYSTEM AND METHOD, the structure and operation of the host processor 42 is discussed in previously cited U.S. patent application Ser. No. 10/684,053 entitled COMPUTING MACHINE HAVING IMPROVED COMPUTING ARCHITECTURE AND RELATED SYSTEM AND METHOD, and the structure and operation of the pipeline accelerator 44 is discussed in previously cited U.S. patent application Ser. Nos. 10/683,929 entitled PIPELINE ACCELERATOR FOR IMPROVED COMPUTING ARCHITECTURE AND RELATED SYSTEM AND METHOD and 10/683,932 entitled PIPELINE ACCELERATOR HAVING MULTIPLE PIPELINE UNITS AND RELATED COMPUTING MACHINE AND METHOD. The operating configurations of the PLICs that compose the accelerator 44 are discussed in previously cited U.S. patent application Ser. No. 10/683,929 entitled PIPELINE ACCELERATOR FOR IMPROVED COMPUTING ARCHITECTURE AND RELATED SYSTEM AND METHOD and below in conjunction with FIGS. 4-6.

Figure 4:
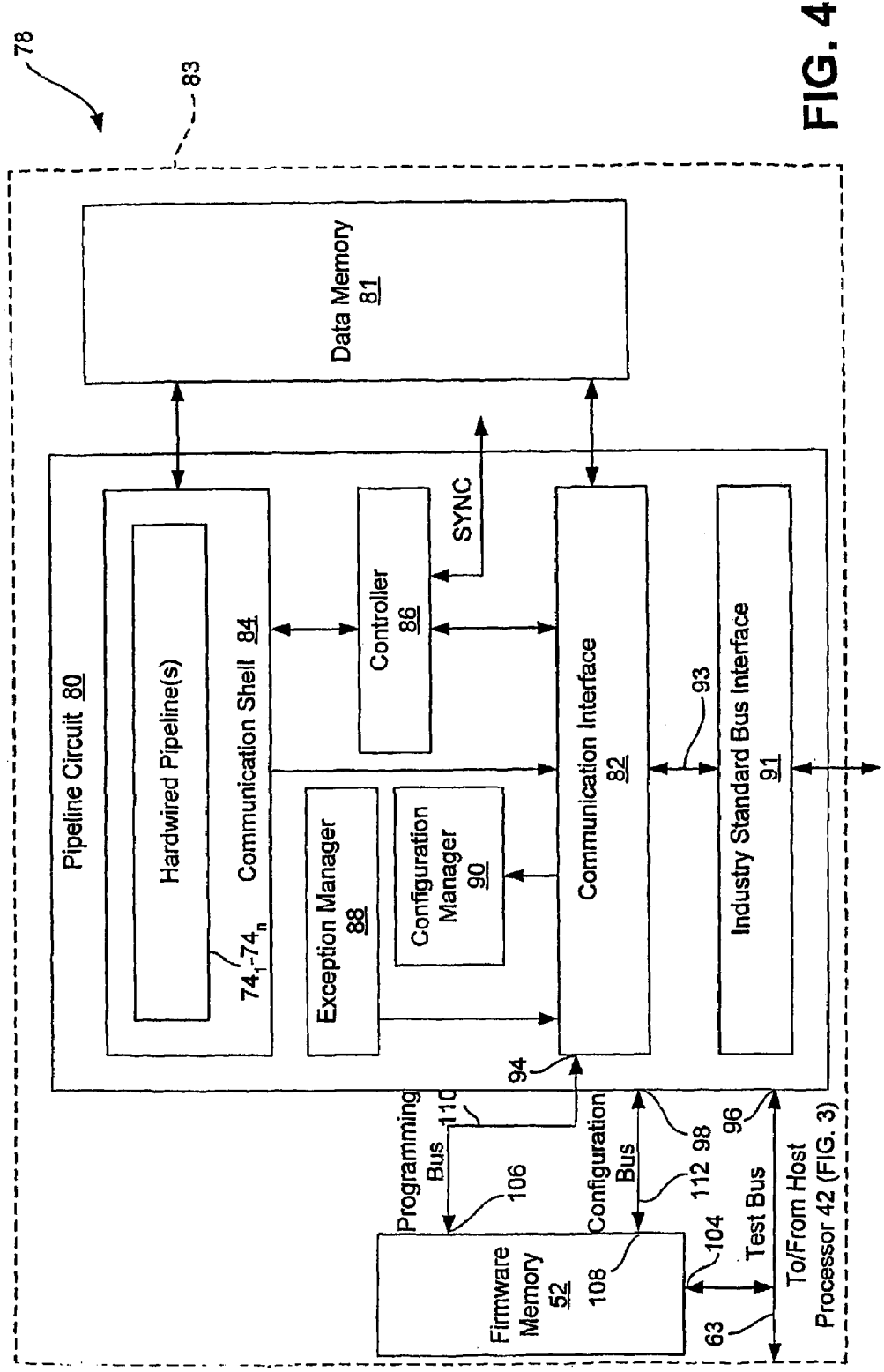
FIG. 4 is a block diagram of a pipeline unit of the pipeline accelerator of FIG. 3 according to an embodiment of the invention.
Figure 5:
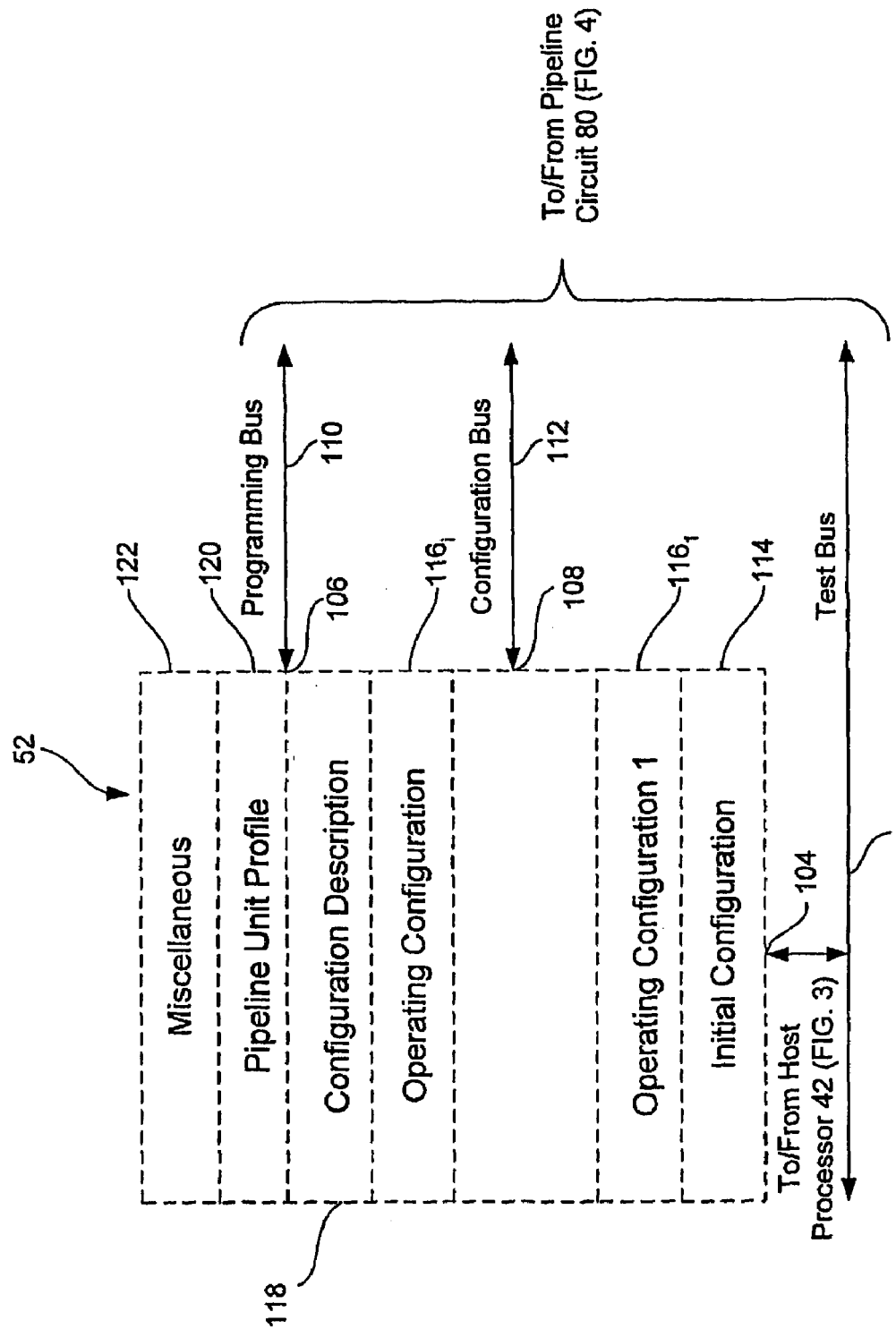
FIG. 5 is a diagram of a logical partitioning of the firmware memory of FIG. 4 according to an embodiment of the invention.
Figure 6:
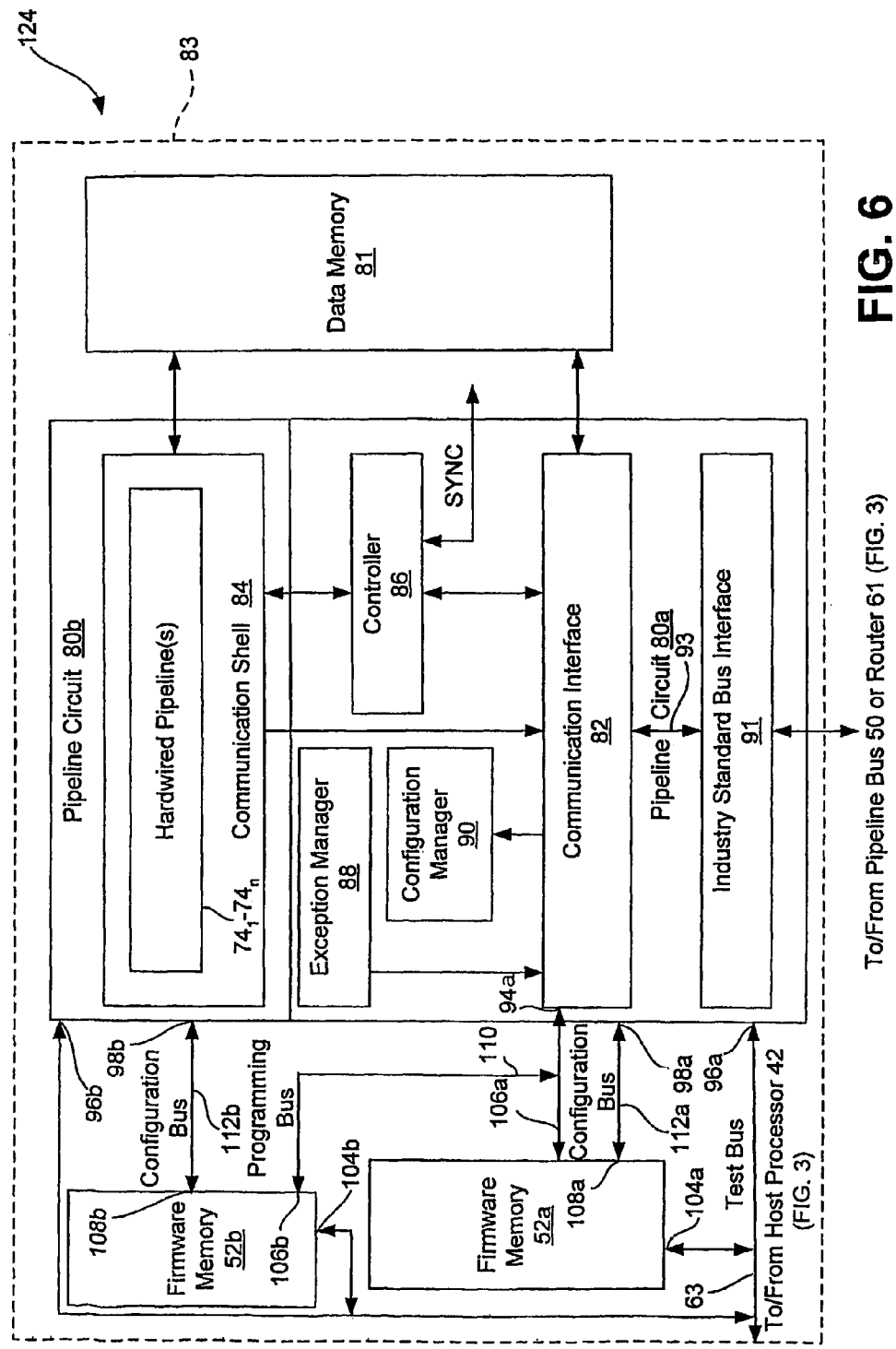
FIG. 6 is a block diagram of a pipeline unit of the pipeline accelerator of FIG. 3 according to another embodiment of the invention.

Referring to FIGS. 4-6, techniques for "hard" configuring the accelerator 44 PLICs are discussed. As alluded to above, the hard configuration of a PLIC is programmed by firmware and denotes the specific physical interconnections among the components of the PLIC, i.e., how one logic block is electrically connected to another logic block. This is in contrast to the "soft" configuration, which denotes a higher-level configuration of an already-hard-configured PLIC. For example, a hard-configured PLIC may include a buffer, and may also include a register that allows one to soft configure the size of the buffer by loading corresponding soft-configuration data into the register. Soft configuration of the accelerator 44 is further discussed in previously cited U.S. patent application Ser. Nos. 10/684,053 entitled COMPUTING MACHINE HAVING IMPROVED COMPUTING ARCHITECTURE AND RELATED SYSTEM AND METHOD and 10/683,929 entitled PIPELINE ACCELERATOR FOR IMPROVED COMPUTING ARCHITECTURE AND RELATED SYSTEM AND METHOD.

FIG. 4 is a block diagram of a pipeline unit 78 of the pipeline accelerator 44 of FIG. 3 according to an embodiment of the invention. The hardwired pipelines $74_1$-$74_n$ (FIG. 3) are part of the pipeline unit 78, which, as discussed below, includes circuitry that, e.g., controls the hardwired pipelines and allows them to receive, send, and store data. Although only one pipeline unit 78 is shown in FIG. 4, the accelerator 44 may include multiple pipeline units (each including at least some of the hardwired pipelines $74_1$-$74_n$) as discussed in previously cited U.S. patent application Ser. No. 10/683,932 entitled PIPELINE ACCELERATOR HAVING MULTIPLE PIPELINE UNITS AND RELATED COMPUTING MACHINE AND METHOD. As discussed below, in one implementation, the hard configuration of the pipeline unit 78 is programmable with firmware. This allows one to modify the functioning of the pipeline unit 78 by merely modifying the firmware. Furthermore, the host processor 42 (FIG. 3) can provide the modified firmware to the pipeline unit 78 during an initialization or reconfiguration of the peer-vector machine 40 (FIG. 3), and thus can eliminate the need for one to manually load the modified firmware into the pipeline unit.

The pipeline unit 78 includes a pipeline circuit 80, such as a PLIC or an ASIC, the firmware memory 52 (where the pipeline circuit is a PLIC), and a data memory 81, which may all be disposed on a circuit board or card 83. The data memory 81 is further discussed in previously cited U.S. patent application Ser. No. 10/683,929 entitled PIPELINE ACCELERATOR FOR IMPROVED COMPUTING ARCHITECTURE AND RELATED SYSTEM AND METHOD, and the combination of the pipeline circuit 80 and the firmware memory 52 forms a programmable-circuit unit.

The pipeline circuit 80 includes a communication interface 82, which transfers data between a peer, such as the host processor 42 (FIG. 3), and the data memory 81, and also between the peer and the following other components of the pipeline circuit: the hardwired pipelines $74_1$-$74_n$ via a communication shell 84, a pipeline controller 86, an exception manager 88, and a configuration manager 90. The pipeline circuit 80 may also include an industry-standard bus interface 91 and a communication bus 93, which connects the interface 82 to the interface 91. Alternatively, the functionality of the interface 91 may be included within the communication interface 82 and the bus 93 omitted. The structure and operation of the hardwired pipelines $74_1$-$74_n$, controller 86, exception manager 88, configuration manager 90, and bus interface 91 are discussed in previously cited U.S. patent application Ser. No. 10/683,929 entitled PIPELINE ACCELERATOR FOR IMPROVED COMPUTING ARCHITECTURE AND RELATED SYSTEM AND METHOD.

The communication interface 82 sends and receives (via the bus interface 91 where present) data in a format recognized by the message handler 64 (FIG. 3), and thus typically facilitates the design and modification of the peer-vector machine 40 (FIG. 3). For example, if the data format is an industry standard such as the Rapid I/O format, then one need not design a custom interface between the host processor 42 and the pipeline unit 78. Furthermore, by allowing the pipeline unit 78 to communicate with other peers, such as the host processor 42 (FIG. 3), via the pipeline bus 50 instead of via a non-bus interface, one can change the number of pipeline units by merely connecting or disconnecting them (or the circuit cards that hold them) to the pipeline bus instead of redesigning a non-bus interface from scratch each time a pipeline unit is added or removed.

Where the pipeline circuit 80 is a PLIC such as an FPGA, the communication interface 82 includes a programming port 94, which allows the pipeline circuit to load firmware from the host processor 42 (FIG. 3) into the firmware memory 52 as discussed below. For example, if the firmware memory 52 is an EEPROM, then during a programming cycle the communication interface 82 generates, and the port 94 delivers, the programming signals that the firmware memory requires. Circuitry for generating such programming signals is conventional, and thus is not discussed further.

The structure and operation of the communication interface 82 is further discussed in previously cited U.S. patent application Ser. No. 10/683,929 entitled PIPELINE ACCELERATOR FOR IMPROVED COMPUTING ARCHITECTURE AND RELATED SYSTEM AND METHOD.

Still referring to FIG. 4, the pipeline circuit 80 also includes a test port 96, and, where the pipeline circuit is a PLIC, a hard-configuration port 98. The test port 96, which is coupled to the test bus 63, allows the host processor 42 (FIG. 3) to monitor the results of a self test that the pipeline circuit 80 may perform during initialization of the peer-vector machine 40 (FIG. 3) as discussed below. The manufacture typically includes the test port 96 with the pipeline circuit 80, and typically provides the test port with an interface (not shown) that is compatible with an industry-standard test protocol such as JTAG. The hard-configuration port 98 allows the pipeline circuit 80 to configure itself by downloading firmware from the memory 52 as discussed below. Like the test port 96, the manufacture typically includes the configuration port 98 with the pipeline circuit 80, and typically provides the configuration port with an industry-standard memory interface and state machine (neither shown) that serially downloads the firmware from a predetermined address range of the memory 52.

As discussed above and further below, where the pipeline circuit 80 is a PLIC, the firmware memory 52 stores the firmware that represents one or more sets hard configurations of the pipeline circuit. The firmware memory 52 includes a test port 104 and programming and configuration ports 106 and 108. The test port 104, which is coupled to the test bus 63, allows the host processor 42 (FIG. 3) to monitor the results of a self test that the firmware memory 52 may perform during initialization of the peer-vector machine 40 (FIG. 3) as discussed below. Also as discussed below, the test port 104 may allow the host processor 42 to load firmware into the memory 52. The manufacture typically includes the test port 104 with the memory 52, and typically provides the test port with an interface (not shown) that is compatible with an industry-standard test protocol such as JTAG. The programming port 106, which is coupled to the programming port 94 of the communication interface 82 via a programming bus 110, allows the pipeline circuit 80 to load firmware into the memory 52 as discussed below. And the hard-configuration port 108, which is coupled to the hard-configuration port 98 of the pipeline circuit 80 via a configuration bus 112, allows the pipeline circuit to download firmware from the memory 52 as discussed below. Typically, the firmware memory 52 is a nonvolatile memory such as an EEPROM, which retains data in the absence of power. Consequently, the firmware memory 52 continues to store the firmware after the pipeline unit 78 is powered down.

Still referring to FIG. 4, although the firmware memory 52 and the data memory 81 are described as being external to the pipeline circuit 80, either or both memories may be incorporated into the pipeline circuit. Where the memory 52 is disposed inside of the pipeline circuit 80, a designer may need to modify the structures of the programming and configuration busses 110 and 112 accordingly. Furthermore, although the pipeline unit 78 is described as having a programming bus 110 that is separate from the configuration bus 112, a single bus (not shown) may perform the functions of both the programming and configuration busses. Alternatively, the pipeline unit 78 may include multiple instances this single bus, or multiple instances of one or both of the programming and configuration 112 and 110.

FIG. 5 is a diagram of a logical partitioning of the firmware memory 52 of FIG. 4 according to an embodiment of the invention.

A section 114 of the memory 52 stores firmware that represents an initial configuration of the pipeline circuit 80 (FIG. 4). That is, when downloaded to the pipeline circuit 80, this firmware causes the pipeline circuit to have the initial configuration. In one implementation of the initial configuration, the pipeline circuit 80 includes the communication interface 82 (and the industry-standard bus interface 91 if needed) of FIG. 4 and self-test circuitry (not shown) that executes a self test of the pipeline circuit and the data memory 81. The pipeline circuit 80 can then provide the results of the self test to the host processor 42 (FIG. 3) via the test bus 63 or the communication interface 82. The initial configuration also allows the host processor 42 to load modified firmware into the firmware memory 52 via the communication interface 82 and the programming bus 110 as discussed below.

Sections $116_1$-$116_i$ of the memory 52 each store firmware that represents a respective operating configuration of the pipeline circuit 80. Typically, the pipeline circuit 80 downloads the firmware from a predetermined one of the sections $116_1$-$116_i$ at the end of the initialization of the accelerator 44 (FIG. 3). As discussed below, the pipeline circuit 80 may be preprogrammed to download firmware from a particular section $116_1$-$116_n$, or the host processor 42 (FIG. 3) may instruct the pipeline circuit to download the firmware from a particular section. Typically, in each of the i operating configurations, the pipeline circuit 80 includes the components (e.g., hardwired pipelines $74_1$-$74_n$, controller 86) shown in FIG. 4. But in each of these configurations, the pipeline circuit 80 typically operates a differently. For example, the communication interface 82 may implement one protocol in one configuration and another protocol in another configuration. Or, the pipelines $74_1$-$74_n$ may perform one set of operations on data in one configuration and perform another set of operations on the data in another configuration.

Optional section 118 stores a description or identification of the operating configurations respectively represented by the firmware stored in the sections $116_1$-$116_i$ of the memory 52. This description/identification allows the host processor 42 (FIG. 3) to identify the firmware stored in the memory 52.

Optional section 120 stores a profile of the pipeline unit 78 (FIG. 4). The profile typically describes the hardware layout of the pipeline unit 78 sufficiently for the host processor 42 (FIG. 3) to appropriately configure itself, the pipeline unit, and other peers (not shown) of the peer-vector machine 40 (FIG. 3) for intercommunication. For example, the profile may identify the data operations and communication protocols that the pipeline unit 78 is capable of implementing, the size of the data memory 81, the operating configurations represented by the firmware stored in sections $116_1$-$116_i$ (if the section 118 is omitted), and a currently desired operating configuration. Consequently, by reading the profile during initialization of the peer-vector machine 40, the host processor 42 can properly configure the message handler 64 (FIG. 3) to communicate with the pipeline unit 78. Furthermore, the host processor 42 may select the section $116_1$-$116_i$ of firmware that the pipeline circuit 80 should download. Or, if none of this firmware is suitable, the host processor 42 may load modified firmware into the memory 52. This technique is analogous to the "plug and play" technique by which a computer can configure itself to communicate with a newly installed peripheral such as a disk drive.

Alternatively, the section 120 may store a profile identifier—often called a "running index"—that allows the host processor 42 (FIG. 3) to retrieve the profile from a table that is stored in, e.g., the accelerator configuration registry 70 (FIG. 3). The running index is typically a number, much like a model number of a product, which the host processor 42 can match to a stored profile.

In yet another alternative, the pipeline unit 78 (FIG. 4) may store the profile identifier in a "hardwired" form to eliminate the chance that one may inadvertently overwrite the profile in the section 120. For example, the pipeline unit 78 may store the profile identifier in a hardwired "register" that the host processor 42 (FIG. 3) can read via the test bus 63, or via the pipeline bus 50 and the pipeline circuit 80 (FIG. 4). This register may be formed from, e.g., electromechanical switches, jumpers, or soldered connections (not shown).

Still referring to FIG. 5, optional section 122 of the firmware memory 52 may store miscellaneous data, such as a self-test routine that the firmware memory 52 runs during initialization of the accelerator 44.

Referring to FIGS. 3-5, the operation of the peer-vector machine 40—particularly the operation of the host processor 42, pipeline circuit 80, and firmware memory 52—is discussed below according to an embodiment of the invention.

When the peer-vector machine 40 is first powered on, the host processor 42 initializes itself as discussed in previously cited U.S. patent application Ser. No. 10/684,053 entitled COMPUTING MACHINE HAVING IMPROVED COM- PUTING ARCHITECTURE AND RELATED SYSTEM AND METHOD, and the accelerator 44 partially initializes itself. More specifically, during this partial initialization, the pipeline circuit 80 downloads the initial-configuration firmware from the section 114 of the memory 52. As discussed above, in the initial configuration, the pipeline circuit 80 includes at least the communication interface 82 and test circuitry (not shown). After the pipeline circuit 80 is configured in the initial configuration, the test circuitry performs a self test of the pipeline circuit and the data memory 81, and provides the results of the self test to the host processor 42 via the test port 96 and the test bus 63. The firmware memory 52 may also perform a self test and provide the results to the host processor 42 via the test port 104 and the test bus 63 as discussed above in conjunction with FIG. 5.

Next, the host processor 42 determines if an exception occurred during the partial initialization of the accelerator 44. For example, the host processor 42 analyzes the self-test results from the test bus 63 to determine whether the pipeline circuit 80, the data memory 81, and the firmware memory 52 are functioning properly.

If an exception did occur, then the host processor 42 handles it in a predetermined manner. For example, if the host processor 42 does not receive a self-test result from the pipeline circuit 80, then it may check, via the test bus 63, whether the initial-configuration firmware is stored in the section 114 of the firmware memory 52. If the initial-configuration firmware is not stored, then the host processor 42 may load the initial-configuration firmware into the section 114 via the pipeline bus 50 or the test bus 63, cause the pipeline circuit 80 to download this firmware, and then analyze the result of the self test. The host processor's handling of exceptions is further discussed in previously cited U.S. patent application Ser. No. 10/684,053 entitled COMPUTING MACHINE HAVING IMPROVED COMPUTING ARCHITECTURE AND RELATED SYSTEM AND METHOD.

If no exception occurred, then host processor 42 reads the profile identifier from the pipeline unit 78, and subsequently obtains the corresponding profile of the pipeline unit from the accelerator configuration registry 70. Obtaining the profile from the registry 70 instead of from the section 120 of the firmware memory 52 is often preferred, because if the pipeline circuit 80 is an ASIC, then the pipeline unit 78 may not include a nonvolatile memory such as the firmware memory. If the profile identifier indicates that the pipeline circuit 80 is an ASIC, then the host processor 42 determines that no firmware need be downloaded to the pipeline circuit. Alternatively, the host processor 42 (FIG. 3) may obtain the profile from the section 120 of the firmware memory 52. In this alternative, it is unnecessary for the pipeline unit 78 to store a profile identifier, although the pipeline unit may store a profile identifier in case the profile is inadvertently deleted from the section 120.

Next, after reading the profile identifiers from all of the pipeline units 78 (only one shown in FIG. 4), the host processor 42 effectively generates a map of all the pipeline units 78 in the accelerator 44, and stores this map, e.g., in the handler memory 68.

Then, for each pipeline unit 78, the host processor 42 extracts from the profile the identity of the desired operating configuration of the pipeline circuit 80. Extracting the desired operating configuration during initialization of the accelerator 44 allows one to modify the operation of the pipeline circuit 80 by merely updating the profile prior to the initialization.

Next, the host processor 42 determines whether the firmware that represents the desired operating configuration is stored in the firmware memory 52. For example, the host processor 42 can read the configuration description from the memory section 118 via the programming bus 110 and the communication interface 82—because the pipeline circuit 80 is in the initial configuration, the communication interface is present—to determine whether the desired firmware is stored in any of the sections $116_1$-$116_i$. Alternatively, the host processor 42 may read the configuration description directly from the memory 52 via the test bus 63 and the test port 104.

If the firmware that represents the desired operating configuration is not stored in the firmware memory 52, then the host processor 42 loads this firmware from the accelerator configuration registry 70 into one of the sections $116_1$-$116_i$ of the firmware memory via the communication interface 82, the programming ports 94 and 106, and the programming bus 110. If the firmware is not in the registry 70, then the host processor 42 may retrieve the firmware from an external library (not shown), or may generate an exception indicator so that a system operation (not shown) can load the firmware into the registry 70.

Next, the host processor 42 instructs the pipeline circuit 80 to download the desired firmware from the corresponding section $116_1$-$116_i$ of the memory 52 via the port 108, the configuration bus 112, and the port 98.

After the pipeline circuit 80 downloads the desired firmware, it is in the desired operating configuration and is ready to begin processing data. But even after the pipeline circuit 80 is in its desired operating configuration, the host processor 42 may load new firmware into the sections $116_1$-$116_i$ of the memory 52 via the communication interface 82 or via the test bus 63. For example, to load new firmware, the host processor 42 may first cause the pipeline circuit 80 to reload the firmware from the section 114 of the memory 52 so that the pipeline circuit is again in the initial configuration. Then, the host processor 42 loads the new firmware into one of the sections $116_1$-$116_i$ via the pipeline bus 50 and the communication interface 82. Next, the host processor 42 causes the pipeline circuit 80 to download the new firmware so that the pipeline circuit is in the new operating configuration. Allowing the pipeline circuit 80 to load new firmware into the memory 52 only when in the initial configuration provides two advantages. First, it prevents the pipeline circuit 80 from inadvertently altering the firmware stored in the memory 52 when the pipeline circuit is in an operating configuration. Second, it allows the operating configurations to utilize resources of the pipeline circuit 80 that would otherwise be used for the circuitry needed to write firmware to the memory 52.

FIG. 6 is a block diagram of a pipeline unit 124 of the pipeline accelerator 44 of FIG. 3 according to another embodiment of the invention.

The pipeline unit 124 is similar to the pipeline unit 78 of FIG. 4 except that the pipeline unit 124 includes multiple pipeline circuits 80—here two pipeline circuits 80a and 80b—and multiple firmware memories—here two memories 52a and 52b, one memory for each pipeline circuit. The combination of the pipeline circuits 80a and 80b and the firmware memories 52a and 52b forms a programmable-circuit unit. In one implementation, each of the memories 52a and 52b is partitioned as shown in FIG. 5, except that the firmware memory 52b may omit the section 120, which stores the profile of the pipeline unit 124 and which otherwise would be redundant with the section 120 of the memory 52a. Alternatively, the pipeline circuits 80a and 80b may share a single firmware memory that includes respective sections that are operatively similar to the memories 52a and 52b. Increasing the number of pipeline circuits 80 typically allows an increase in the number n of hardwired pipelines $74_1$-$74_n$, and thus an increase in the functionality of the pipeline unit 124 as compared to the pipeline unit 78. Furthermore, either one or both of the pipeline circuits 80a and 80b may be an ASIC, in which case the corresponding firmware memory(ies) 52 may be omitted.

Further details of the structure and operation of the pipeline unit 124 are discussed in previously cited U.S. Patent application Ser. No. 10/683,929 entitled PIPELINE ACCELERATOR FOR IMPROVED COMPUTING ARCHITECTURE AND RELATED SYSTEM AND METHOD.

The pipeline circuit 80a includes a test port 96a and a hard-configuration port 98a, which are respectively similar to the test port 96 and hard-configuration port 98 of FIG. 4. And like the pipeline circuit 80 of FIG. 4, the pipeline circuit 80a includes the communication interface 82 having the programming port 94.

The pipeline circuit 80b includes a test port 96b and a hard-configuration port 98b, which are also respectively similar to the test port 96 and the hard-configuration port 98 of FIG. 4. And because the host processor 42 (FIG. 3) can program the firmware memory 52b via the communication interface 82 of the pipeline circuit 80a as discussed below, the pipeline circuit 80b does not include a programming port.

The firmware memory 52a includes test, programming, and hard-configuration ports 104a, 106a, and 108a, which are respectively similar to the test, programming, and hard-configuration ports 104, 106, and 108 of FIG. 4. The test port 104a is coupled to the test bus 63, the programming port 106a is coupled to the programming port 94a of the communication interface 82 via the programming bus 110, and the hard-configuration port 108a is coupled to the hard-configuration port 98a of the pipeline circuit 80a via a configuration bus 112a.

Likewise, the firmware memory 52b includes test, programming, and hard-configuration ports 104b, 106b, and 108b, which are respectively similar to the test, programming, and hard-configuration ports 104, 106, and 108 of FIG. 4. The test port 104b is coupled to the test bus 63, the programming port 106b is coupled to the programming port 94a of the communication interface 82 via the programming bus 110, and the hard-configuration port 108b is coupled to the hard-configuration port 98b of the pipeline circuit 80b via a configuration bus 112b.

Referring to FIGS. 3, 5 and 6, the operation of the peer-vector machine 40—particularly the host processor 42, the pipeline circuits 80a and 80b, and the firmware memories 52a and 52b—is discussed below according to an embodiment of the invention.

When the peer-vector machine 40 is first powered on, the host processor 42 initializes itself as discussed in previously cited U.S. patent application Ser. No. 10/684,053 entitled COMPUTING MACHINE HAVING IMPROVED COMPUTING ARCHITECTURE AND RELATED SYSTEM AND METHOD, and the accelerator 44 partially initializes itself. More specifically, during this partial initialization, the pipeline circuits 80a and 80b download initial-configuration firmware from the sections 114a and 114b of the firmware memories 52a and 52b, respectively. In the respective initial configurations, the pipeline circuit 80a includes at least the communication interface 82 and test circuitry (not shown), and the pipeline circuit 80b includes at least test circuitry (not shown). After the pipeline circuits 80a and 80b are configured in their respective initial configurations, the test circuit within each pipeline circuit performs a respective self test of the pipeline circuit the test circuitry of one or both of the pipeline circuits 80a and 80b may also test the data memory 81 and provides the results of these self tests to the host processor 42 via the test ports 96a and 96b, respectively, and the test bus 63. The firmware memories 52a and 52b may also perform respective self tests and provide the results to the host processor 42 via the test ports 104a and 104b, respectively, and the test bus 63 as discussed above in conjunction with FIG. 5.

Next, the host processor 42 determines if an exception occurred during the partial initialization of the accelerator 44. For example, the host processor 42 analyzes the self-test results from the test bus 63 to determine whether the pipeline circuits 80a and 80b, the data memory 81, and the firmware memories 52a and 52b are functioning properly.

If an exception did occur, then the host processor 42 handles it in a predetermined manner. For example, if the host processor 42 does not receive a self-test result from the pipeline circuit 80a, then it may check, via the test bus 63, whether the initial-configuration firmware is stored in the section 114a of the firmware memory 52a. If the initial-configuration firmware is not stored, then the host processor 42 may load the initial-configuration firmware into the section 114a, cause the pipeline circuit 80a to download this firmware, and then analyze the result of the self test. This example also applies to the pipeline circuit 50b and the firmware memory 52b. The host processor's handling of exceptions is further discussed in previously cited U.S. patent application Ser. No. 10/684,053 entitled COMPUTING MACHINE HAVING IMPROVED COMPUTING ARCHITECTURE AND RELATED SYSTEM AND METHOD.

If no exception occurred, then the host processor 42 reads the profile identifier from the pipeline unit 124, and subsequently obtains the corresponding profile of the pipeline unit from the accelerator configuration registry 70 or from the section 120 of the firmware memory 52a as discussed above in conjunction with FIG. 4.

Next, after reading the profile identifiers from all of the pipeline units 124 (only one shown in FIG. 4), the host processor 42 effectively generates a map of all the pipeline units in the accelerator 44, and stores this map, e.g., in the handler memory 68.

Then, the host processor 42 extracts from the profile the identities of the desired operating configurations of the pipeline circuits 80a and 80b. Extracting the desired operating configurations during initialization of the accelerator 44 allows one to modify the operation of the pipeline circuit 80a and/or 80b by merely updating the profile prior to the initialization.

Next, the host processor 42 determines whether the firmware that represents the desired operating configurations is stored in the firmware memories 52a and 52b. For example, the host processor 42 can read the configuration description from the memory section 118a of the memory 52a via the programming bus 110 and the communication interface 82—because the pipeline circuit 80a is in the initial configuration, the communication interface is present—to determine whether the desired firmware is stored in any of the sections $116a_1$-$116a_i$. Alternatively, the host processor 42 may read the configuration description directly from the memory 52a via the test bus 63 and the test port 104a. This example also applies to the pipeline circuit 50b and the firmware memory 52b.

If the firmware that represents one or both of the desired operating configurations is not stored in the firmware memories 52a and/or 52b, then the host processor 42 loads this firmware from the accelerator configuration registry 70 into one of the sections $116_1$-$116_i$ of the appropriate firmware memory via the communication interface 82, the programming ports 94 and 106, and the programming bus 110. For example, if the firmware that represents the desired operating configuration of the pipeline circuit 80b is not stored in the memory 52b, then the host processor 42 loads this firmware from the registry 70 into one of the sections $116b_1$-$116b_i$ via the interface 82, programming ports 94 and 106b, and the programming bus 110. If the firmware is not in the registry 70, then the host processor 42 may retrieve the firmware from an external library (not shown), or may generate an exception indicator so that a system operator (not shown) can load the firmware into the registry 70.

Next, the host processor 42 instructs the pipeline circuit 80a to download the desired firmware from the corresponding sections $116a_1$-$116a_i$ of the memory 52a via the port 108a, the configuration bus 112a, and the port 98a, and instructs the pipeline circuit 80b to download the desired firmware from the corresponding sections $116b_1$-$116b_i$ of the memory 52b via the port 108b, the configuration bus 112b, and the port 98b.

After the pipeline circuits 80a and 80b download the desired firmware, they are in the desired operating configurations, and are ready to begin processing data. But even after the pipeline circuits 80a and 80b are in their desired operating configurations, the host processor 42 may load new firmware into the sections $116_1$-$116_i$ of the memories 52a and 52b via the communication interface 82 or via the test bus 63 in a manner similar to that discussed above in conjunction with FIG. 4.

The preceding discussion is presented to enable a person skilled in the art to make and use the invention. Various modifications to the embodiments will be readily apparent to those skilled in the art, and the generic principles herein may be applied to other embodiments and applications without departing from the spirit and scope of the present invention. Thus, the present invention is not intended to be limited to the embodiments shown, but is to be accorded the widest scope consistent with the principles and features disclosed herein.

What is claimed is:

1. A programmable logic integrated circuit operable to function as an end point on an industry standard bus, the programmable logic integrated circuit including an interface to the industry standard bus and being operable through the interface to,
   receive multiple versions of firmware from an external source, each version of firmware representing a corresponding operating configuration;
   store the multiple versions of firmware in a memory;
   download a selected one of the versions of firmware from the memory; and
   configure itself using the downloaded firmware to operate in the corresponding operating configuration;
   wherein the programmable logic integrated circuit further comprises:
      at least one hardwired pipeline, each hardwired pipeline operable to process respective data without executing program instructions;
      a communication shell coupled to the hardwired pipelines and operable to transfer data to and from the hardwired pipelines; and
      a communication interface coupled to the interface to the industry standard bus, the communication interface operable to communicate with the interface to the industry standard bus to transfer data to and from the programmable logic integrated circuit over the industry standard bus, and the communication interface further operable to transfer data to and from each hardwired pipeline via the communication shell.

2. The programmable circuit of claim 1 wherein the memory comprises a nonvolatile memory.

3. The programmable circuit of claim 1 wherein the memory comprises memory external to the programmable logic integrated circuit.

4. A programmable logic integrated circuit operable to function as an end point on an industry standard bus, the programmable logic integrated circuit including an interface to the industry standard bus and being operable to,
   download from a memory storing a plurality of versions of firmware a first firmware version that represents a first configuration;
   configure itself using the first firmware version;
   operate in the first configuration;
   download from the memory a second firmware version that represents a second configuration;
   configure itself using the second firmware version; and
   operate in the second configuration;
   wherein the programmable logic integrated circuit is further operable to:
      receive the second firmware version from an external source via the industry standard bus and interface to the industry standard bus while operating in the first configuration; and
      storing the second firmware version in the memory while operating in the first configuration, and wherein the second firmware version may only be received when operating in the first configuration.

5. The programmable logic integrated circuit of claim 4 wherein the memory comprises an electrically erasable and programmable read-only memory.

6. The programmable logic integrated circuit of claim 4 wherein the circuit comprises a field-programmable gate array.

7. A programmable-circuit unit, comprising:
   A pipeline bus operable to communicate data through an industry standard bus protocol;
   a memory operable to store a plurality of versions of firmware data, each version respectively representing a corresponding configuration of the programmable-circuit unit; and
   a programmable logic integrated circuit coupled to the memory and operable to function as an end point on the pipeline bus, the programmable logic integrated circuit including an interface to the pipeline bus and being operable to,
   download a first selected one of the versions of firmware data from the memory
   operate in the configuration corresponding to the first selected version of firmware data,
   download a second selected one of the versions of firmware data from the memory, and
   operate in the configuration corresponding to the second selected version of firmware data;
   wherein the programmable logic integrated circuit is further operable to:

receive the second selected version of firmware data from an external source via the pipeline bus and the interface to the pipeline bus while operating in the first configuration; and store the second selected version of firmware data in the memory while operating in the first configuration, and wherein the second selected firmware version of firmware may only be received and stored when operating in the configuration corresponding to the first selected version of firmware data.

8. The programmable-circuit unit of claim 7 wherein the programmable logic integrated circuit is operable to load the second firmware while operating in the first configuration.

9. The programmable-circuit unit of claim 7 further comprising a router coupled to the pipeline bus.

10. A programmable-circuit unit, comprising:
a memory operable to store a plurality of firmware configurations, each firmware configuration respectively representing a corresponding operational configuration;
a first programmable logic integrated circuit coupled to the memory and including an interface to an industry standard bus, the first programmable logic integrated circuit operable to receive the firmware configurations via the industry standard bus and to store these configurations in the memory, and wherein the first programmable logic integrated circuit is further operable to,
download a first selected one of the firmware configurations from the memory,
operate in the operational configuration corresponding to the first selected firmware configuration,
download a first different one of the firmware configurations from the memory, and
operate in the operational configuration corresponding to the first different firmware configuration; and
a second programmable logic integrated circuit coupled to the memory and to the first programmable circuit and including an interface that is operable to,
download a second selected one of the firmware configurations from the memory,
operate in the operational configuration corresponding to the second selected one of the firmware configurations,
download a second different one of the firmware configurations from the memory, and
operate in the operational configuration corresponding to the second different firmware configuration; and
wherein the second programmable logic integrated circuit further comprises:
at least one hardwired pipeline, each hardwired pipeline operable to process respective data without executing program instructions;
a communication shell coupled to the hardwired pipelines and operable to transfer data to and from the hardwired pipelines;
wherein the first programmable logic integrated circuit further comprises;
a communication interface coupled to the interface to the industry standard bus, the communication interface operable to communicate with the interface to the industry standard bus to transfer data to and from the first programmable logic integrated circuit over the industry standard bus, and the communication interface further operable to transfer data to and from each hardwired pipeline via the communication shell.

11. The programmable-circuit unit of claim 10 wherein the first programmable logic integrated circuit is further operable to:
receive the first and second different ones of the firmware configurations from an external source via the industry standard bus while operating in a first configuration; and
store the first and second different ones of the firmware configurations in the memory while operating in the first configuration.

12. The programmable-circuit unit of claim 10 wherein the first and second programmable logic integrated circuits comprise respective field-programmable gate arrays.

13. A computing machine, comprising:
a processor;
an industry-standard bus coupled to the processor, the industry-standard bus adapted to be coupled to standard peripheral devices; and
a memory that stores a plurality of firmware configurations; and
a programmable logic integrated circuit coupled to the memory, and the programmable logic integrated circuit directly coupled to the industry standard bus and through this bus to the processor, the programmable integrated circuit operable to,
receive from the processor a new firmware configuration that represents a new configuration of the programmable circuit,
store the new firmware configuration in the memory, and
download the new firmware configuration from the memory in response to the processor; and
wherein the programmable logic integrated circuit further comprises:
an interface coupled to the industry standard bus;
at least one hardwired pipeline, each hardwired pipeline operable to process respective data without executing program instructions;
a communication shell coupled to the hardwired pipelines and operable to transfer data to and from the hardwired pipelines; and
a communication interface coupled to the interface to the industry standard bus, the communication interface operable to communicate with the interface to the industry standard bus to transfer data to and from the programmable logic integrated circuit over the industry standard bus, and the communication interface further operable to transfer data to and from each hardwired pipeline via the communication shell.

14. The computing machine of claim 13 wherein the processor is operable to:
before sending the new firmware configuration to the programmable logic integrated circuit, determine whether the new firmware configuration is already stored in the memory; and
send the new firmware configuration to the programmable circuit only if the firmware is not already stored in the memory.

15. The computing machine of claim 13, further comprising:
a configuration registry coupled to the processor and operable to store the new firmware configuration and to indicate that the firmware configuration represents a desired configuration for the programmable circuit; and wherein the processor is operable to download the firmware configuration from the configuration registry to the programmable circuit.

16. The computing machine of claim 13, wherein:
the programmable logic integrated circuit includes a hardwired pipeline that is operable to operate on data.

17. A computing machine, comprising:
a processor;
an industry-standard bus coupled to the processor, the industry-standard bus adapted to be coupled to standard peripheral devices;
a memory operable to store a plurality of firmware versions that respectively represent configurations of a programmable logic integrated circuit, the programmable logic integrated circuit being coupled to the memory and being coupled directly to the industry standard bus and through this bus to the processor, the programmable logic integrated circuit operable to,
download a selected one of the firmware versions from the memory,
operate in the configuration corresponding to the downloaded firmware version,
download a different firmware version from the memory in response to the processor, and
operate in the configuration corresponding to the different firmware version;
wherein the programmable logic integrated circuit further comprises:
an interface coupled to the industry standard bus;
at least one hardwired pipeline, each hardwired pipeline operable to process respective data without executing program instructions;
a communication shell coupled to the hardwired pipelines and operable to transfer data to and from the hardwired pipelines; and
a communication interface coupled to the interface to the industry standard bus, the communication interface operable to communicate with the interface to the industry standard bus to transfer data to and from the programmable logic integrated circuit over the industry standard bus, and the communication interface further operable to transfer data to and from each hardwired pipeline via the communication shell.

18. The computing machine of claim 17 wherein:
the processor comprises a first test port;
the programmable logic integrated circuit comprises a second test port that is coupled to the first test port; and
the processor is operable to load the selected one of the firmware versions into memory via the first and second test ports.

19. The computing machine of claim 17 wherein:
the processor comprises a first test port;
the programmable logic integrated circuit comprises a second test port that is coupled to the first test port;
while operating in the configuration corresponding to the selected one of the firmware versions, the programmable logic integrated circuit is operable to perform a self test and to provide self-test data to the processor via the first and second test ports; and
the processor is operable to cause the programmable logic integrated circuit to download the different firmware version from memory only if the self-test data indicates a predetermined result of the self test.

20. The computing machine of claim 17 wherein:
the processor is operable to send the selected one of the firmware versions to the programmable logic integrated circuit; and
while operating in the configuration corresponding to the selected one of the firmware versions, the programmable logic integrated circuit is operable to load the different firmware version into the memory in response to the processor.

21. A computing machine, comprising:
a processor;
an industry-standard bus coupled to the processor and adapted to be coupled to standard peripheral devices;
a memory operable to store a plurality of firmware codes that respectively represent configurations,
a first programmable logic integrated circuit coupled to the memory and coupled directly to the industry-standard bus and through this bus to the processor, the first programmable logic integrated circuit operable to,
download a first firmware code from the memory,
operate in a first configuration corresponding to the first firmware code,
download a second firmware code from the memory in response to the processor, and
operate in a second configuration corresponding to the second firmware code, and
a second programmable logic integrated circuit coupled to the memory and to the first programmable circuit, and coupled through the first programmable logic integrated circuit to the industry-standard bus and through this bus to the processor, the second programmable logic integrated circuit operable to,
download a third firmware code from the memory,
operate in a third configuration corresponding to the third firmware code,
download a fourth firmware code from the memory in response to the processor, and
operate in a fourth configuration corresponding to the fourth firmware code;
wherein the first programmable logic integrated circuit further comprises:
an interface coupled to the industry standard bus;
at least one hardwired pipeline, each hardwired pipeline operable to process respective data without executing program instructions;
a communication shell coupled to the hardwired pipelines and operable to transfer data to and from the hardwired pipelines; and
a communication interface coupled to the interface to the industry standard bus, the communication interface operable to communicate with the interface to the industry standard bus to transfer data to and from the programmable logic integrated circuit over the industry standard bus, and the communication interface further operable to transfer data to and from each hardwired pipeline via the communication shell.

22. The computing machine of claim 21 wherein:
while operating in the first configuration, the first programmable logic integrated circuit is operable to perform a first self test and to provide first self-test data to the processor;
while operating in the third configuration, the second programmable logic integrated circuit is operable to perform a second self test and to provide second self-test data to the processor; and the processor is operable to cause the first and second programmable circuits to respectively load the second and fourth firmware codes from the memory only if the first and second self-test data indicate respective predetermined results of the first and second self tests.

23. The computing machine of claim 21 wherein:

the processor is operable to send the second and fourth firmware codes to the first programmable logic integrated circuit; and while operating in the first configuration, the first programmable logic integrated circuit is operable to load the second and fourth firmware codes into the memory in response to the processor.

24. The computing machine of claim 21 wherein the memory comprises:

a first memory section coupled to the first programmable logic integrated circuit and operable to store the first and second firmware codes; and a second memory section coupled to the first and second programmable logic integrated circuits and operable to store the third and fourth firmware codes.

25. The computing machine of claim 24 wherein the first and second memory sections are respectively disposed on first and second integrated circuits.

26. A method, comprising:

storing in a memory a plurality of firmware codes, each firmware code representing a configuration of a programmable logic integrated circuit;

downloading over an industry-standard bus directly into the programmable logic integrated circuit a first firmware code that represents a first configuration;

operating the programmable logic integrated circuit in the first configuration;

downloading into the programmable logic integrated circuit second firmware that represents a second configuration;

operating the programmable logic integrated circuit in the second configuration after downloading the second firmware; and wherein the firmware that represents the second configuration may only be stored when the programmable logic integrated circuit is operating in the first configuration.

27. The method of claim 26 wherein downloading the second firmware code comprises:

sending the second firmware code to the programmable logic integrated circuit;

loading the second firmware code into the memory with the programmable logic integrated circuit while the programmable logic integrated circuit is operating in the first configuration; and downloading the second firmware code from the memory into the programmable logic integrated circuit.

28. The method of claim 26 wherein downloading the second firmware code comprises:

determining whether the second firmware code is stored in the memory coupled to the programmable logic integrated circuit;

sending the second firmware code to the programmable logic integrated circuit only if the second firmware code is not stored in the memory;

loading the second firmware code into the memory with the programmable logic integrated circuit while the programmable logic integrated circuit is operating in the first configuration; and downloading the second firmware code from the memory into the programmable logic integrated circuit.

29. The method of claim 26 wherein:

operating the programmable logic integrated circuit in the first configuration comprises testing the programmable logic integrated circuit; and downloading the second firmware code comprises downloading the second firmware code only if the programmable logic integrated circuit passes the testing.

30. A method, comprising:

storing in memory a plurality of firmware codes, each firmware code defining a corresponding operational configuration for one of first and a second programmable logic integrated circuit;

downloading over an industry-standard bus a first and a second one of the firmware codes directly into the first and second programmable logic integrated circuits, respectively;

operating the first and second programmable logic integrated circuits in the first and second operational configurations, respectively;

downloading a third and a fourth firmware code directly into the first and second programmable logic integrated circuits, respectively, via the first programmable logic integrated circuit;

operating the first and second programmable logic integrated circuits in the third configuration and fourth configurations, respectively; and wherein the third and fourth firmware code may only be downloaded when the first and second programmable logic integrated circuits are operating in the first and second operational configurations, respectively.

31. The method of claim 30 wherein:

operating the first and second programmable logic integrated circuits in the first and second configurations comprises testing the first and second programmable logic integrated circuits; and loading the third and fourth firmware codes into the first and second programmable logic integrated circuits comprises, loading the third firmware code only if the testing indicates that the first programmable logic integrated circuit is functioning as desired, and loading the fourth firmware code only if the testing indicates that the second programmable logic integrated circuit is functioning as desired.

* * * * *

UNITED STATES PATENT AND TRADEMARK OFFICE
CERTIFICATE OF CORRECTION

PATENT NO. : 7,373,432 B2  
APPLICATION NO. : 10/684057  
DATED : May 13, 2008  
INVENTOR(S) : Rapp et al.

Page 1 of 1

It is certified that error appears in the above-identified patent and that said Letters Patent is hereby corrected as shown below:

Title Page, Item (73)
Correction of the Assignee data on the front page of the letters patent is requested:

Lockheed Martin Corporation
Bethesda, Maryland (US)

Signed and Sealed this

Twenty-fourth Day of November, 2009

David J. Kappos
*Director of the United States Patent and Trademark Office*